(No Model.)
C. V. BOYS.
ELECTRIC METER.
No. 254,597. Patented Mar. 7, 1882.
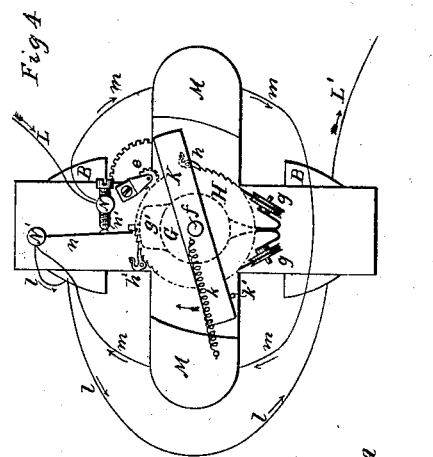
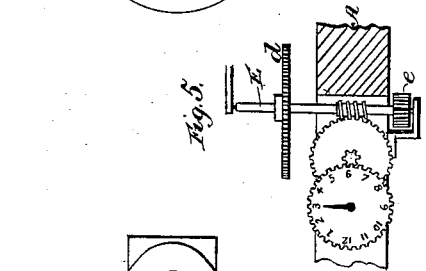
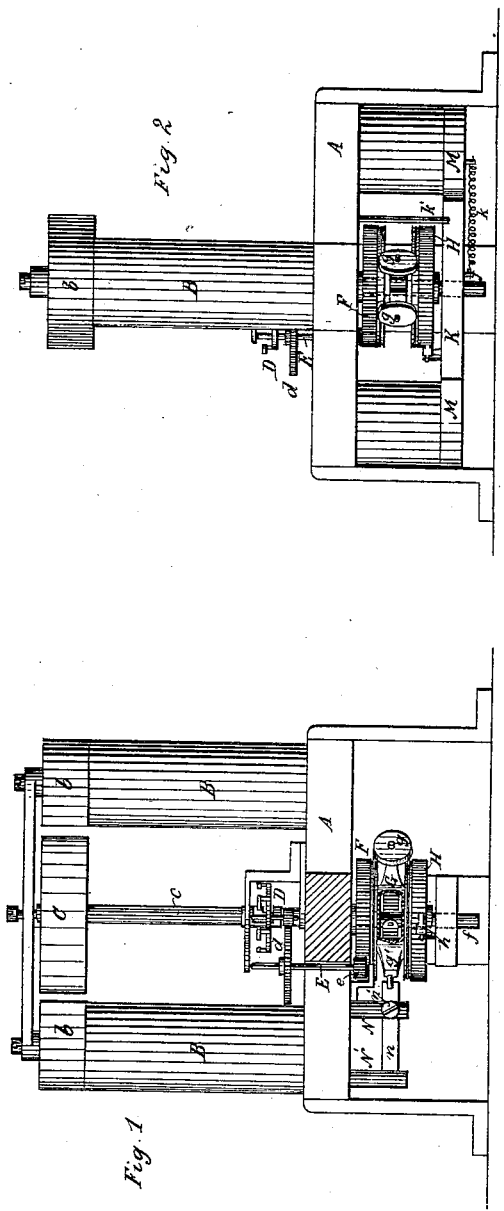
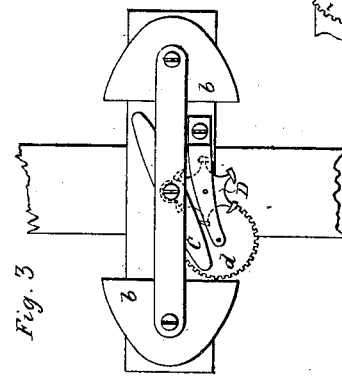
Witnesses.
J. A. Rutherford
Robert Everett.
Inventor:
Charles Vernon Boys.
By James L. Norris.
Atty

UNITED STATES PATENT OFFICE.

CHARLES V. BOYS, OF WING, NEAR OAKHAM, COUNTY OF RUTLAND, ENGLAND.

ELECTRIC METER.

SPECIFICATION forming part of Letters Patent No. 254,597, dated March 7, 1882.

Application filed December 8, 1881. (No model.) Patented in England October 13, 1881, and in France November 11, 1881.

*To all whom it may concern:*

Be it known that I, CHARLES VERNON BOYS, a citizen of England, residing at Wing, near Oakham, in the county of Rutland, England, have invented a new or Improved Electric Meter or Apparatus for Measuring and Registering the Quantity of Electricity Passed Through a Conductor, (for which I have applied for a patent in Great Britain, No. 4,472, bearing date October 13, 1881;) of which the following is a specification.

My invention relates to means of measuring and registering the quantity of electricity passed through a conductor—as, for example, the quantity transmitted from a battery or other source of electricity to electric lights, or to machines worked by electricity. For this purpose I provide clock-work, with an escapement governed by a pendulum or balance the oscillations of which are determined by the force of an electro-magnet or solenoid having its coil in the electrical circuit, so that, according as a less or greater quantity of electricity passes through the circuit, the amount of movement permitted to the clock-work is less or greater. A counter connected to the clock-work shows by suitable indices the quantity of electricity that passes in a given time. In order to secure accuracy of indication, the escapement should be of the dead-beat kind, incapable of giving such impulse to the pendulum or balance as would cause it to oscillate. The clock-work may be driven by a weight or spring wound up from time to time by hand. I prefer, however, to render it self-acting by combining with it a remontoir apparatus which, when required, is acted on by an electro-magnet in the circuit, straining a spring or raising a weight that keeps the clock-work going.

Figure 1 of the accompanying drawings is a front view. Fig. 2 is a side view; Fig. 3, a plan, looking from above, and Fig. 4, a plan, looking from below, of an electric meter with remontoir apparatus, according to my invention; Fig. 5, a detached view, showing the arrangement of a counter or register operated by a worm on the arbor.

On a base, A, I fix the two limbs B B of an electro-magnet, having its coil in the circuit the electric current in which is to be measured. These limbs terminate in polar extension-pieces $b\ b$, between which an oscillating armature, C, of magnetic metal, is mounted on a vertical axis, $c$. The lower part of the axis $c$ constitutes the cylinder of an escapement engaging with an escapement-wheel, D, which is connected by suitable gearing, $d$, to an arbor, E, driven by clock-work.

The clock-work may be worked by a weight or spring which is from time to time wound up by hand. I prefer, however, as stated above, to wind it up by remontoir apparatus worked by the electricity itself, as I will now describe.

On a fixed axis, $f$, projecting from the base A are mounted, free to revolve, the following parts: First, a toothed wheel, F, which gears with a pinion, $e$, on the arbor E, and which has a groove in its circumference to receive a driving-band; secondly, a barrel, G, containing a volute spring, this spring having one of its ends attached to the interior of the barrel and its other end attached to the pin $f$; thirdly, a ratchet-wheel, H, grooved like F, to receive the same driving-band which passes over guide-pulleys $g\ g$, mounted on spring-brackets projecting from the barrel G; and, fourthly, an armature, K, which can oscillate between the poles M M of an electro-magnet fixed to the base A. This armature is drawn by a spring, $k$, against a stop-pin, $k'$, and it carries a spring-pawl, $h$, engaging the teeth of the ratchet-wheel H, with which also engages a pawl, $h'$, to prevent the wheel from turning backward. The coils of the electro-magnet M M are in a by-pass circuit, $m\ m$, branching off from the main circuit L L at the connecting-posts N N'. These posts are usually connected by a spring, $n$, bearing against a contact-screw, $n'$, and in that case the main current passes direct from L through N to N', and by the wires $l\ l$ through the coils of the electro-magnet B B to L, the magnet M M being then excited too feebly to effect displacement of the armature K. When, however, the spring-barrel G turns to such a position that a stud, $g'$, projecting from it presses the spring $n$ away from the screw $n'$ then, the direct connection between N and N' being thus broken, the current must pass through the coils of the magnet M M. The armature K is then attracted in the direction of the arrow, Fig. 4, and by its pawl $h$ turns the ratchet-wheel H partly round. A small portion of this movement of H is communicated by the band to the wheel F, but the principal portion tends, by means of the pulleys $g$ $g$, to turn the spring-barrel G, winding up the spring inclosed in it, and at the same time releasing the spring $n$, which thereupon makes contact again with $n'$, short-circuiting the current. The magnet M M being thus rendered comparatively inert, the armature K is drawn back by its spring $k$, ready to act again, as described. The partial winding up of the spring in the barrel G thus effected is sufficient to maintain for a time the movement of the escapement-wheel D, which is thus by the intermittent winding action of the armature K kept in motion while an electrical current passes along the conductor L L. The velocity of the motion of D manifestly depends on the rate at which the armature C is made to oscillate, and this rate is determined by the attraction of the magnets B B—that is to say, by the electric force passing through their coils. If, therefore, a counter of any known kind be connected by gearing to the arbor E—as, for example, as shown in Fig. 5—the indication given by this counter after a certain time of action, being proportional to the number of oscillations of the armature C, will be a measure of the electricity that has passed during that time along the conductor L L.

Having thus described the nature of my invention and the best means I know of putting it in practical operation, I claim—

1. In an electric meter, the combination of clock-work having an escapement governed by a pendulum or balance of magnetic metal, with an electro magnet the poles of which are arranged to determine the movements or oscillations of the pendulum or balance, said magnet being in the electrical circuit the current through which is to be measured, substantially as and for the purpose described.

2. In an electric meter, the combination of a spring-actuated train of gears, a pendulum or balance of magnetic metal arranged between the poles of an electro-magnet, said magnet being included in the electric circuit the current through which is to be measured, and a rewinding mechanism, all substantially as shown and described.

In testimony whereof I have signed my name to this specification, in the presence of two subscribing witnesses, this 16th day of November, A. D. 1881.

C. V. BOYS.

Witnesses:
OLIVER IMRAY,
JOHN DEAN.